United States Patent [19]

Garrido

[11] Patent Number: 4,585,070
[45] Date of Patent: Apr. 29, 1986

[54] ROPE SOCKET TRAYS PROTECTION AGAINST INTERNAL AND OUTER FIRES

[76] Inventor: Lorenzo G. Garrido, Ramón y Cajal, 32, Castellón de la Plana, Spain

[21] Appl. No.: 651,637

[22] Filed: Sep. 17, 1984

Related U.S. Application Data

[63] Continuation of Ser. No. 380,004, May 19, 1982, abandoned.

[30] Foreign Application Priority Data

Jul. 9, 1981 [ES] Spain .................................. 503814

[51] Int. Cl.[4] .......................... H02G 3/04; A62C 3/00
[52] U.S. Cl. ................................................... 169/48
[58] Field of Search ............... 428/365, 377, 920, 921; 169/45, 40; 220/88 R

[56] References Cited

U.S. PATENT DOCUMENTS

| | | | |
|---|---|---|---|
| 1,890,291 | 12/1932 | Hinsky | 428/365 |
| 1,937,561 | 8/1931 | Gillies | 428/365 X |
| 2,055,223 | 9/1936 | Robbin | 428/365 X |
| 4,018,983 | 4/1977 | Pedlow | 220/88 R |
| 4,064,359 | 12/1977 | Peterson et al. | 428/921 |
| 4,135,055 | 1/1979 | Beckers et al. | 169/48 |
| 4,223,175 | 9/1980 | Crew et al. | 169/48 |
| 4,282,284 | 8/1981 | George | 428/377 X |
| 4,319,940 | 3/1982 | Arroyo et al. | 428/921 X |
| 4,433,732 | 2/1984 | Licht et al. | 169/48 |

FOREIGN PATENT DOCUMENTS

| | | | |
|---|---|---|---|
| 0063336 | 10/1982 | European Pat. Off. | 169/48 |
| 7929551 | 6/1980 | United Kingdom | 169/48 |

*Primary Examiner*—Jeffrey V. Nase
*Assistant Examiner*—Kevin Patrick Weldon
*Attorney, Agent, or Firm*—Michael J. Striker

[57] ABSTRACT

A fire protective system for cable trays comprises a plurality of flexible mattresses surrounding the cable trays and rigidly connected to a supporting structure mounted on the cable trays. Each mattress is formed of a fiber glass inner casing and a fire-resistant outer cover of textile material.

8 Claims, 7 Drawing Figures

FIG. 4
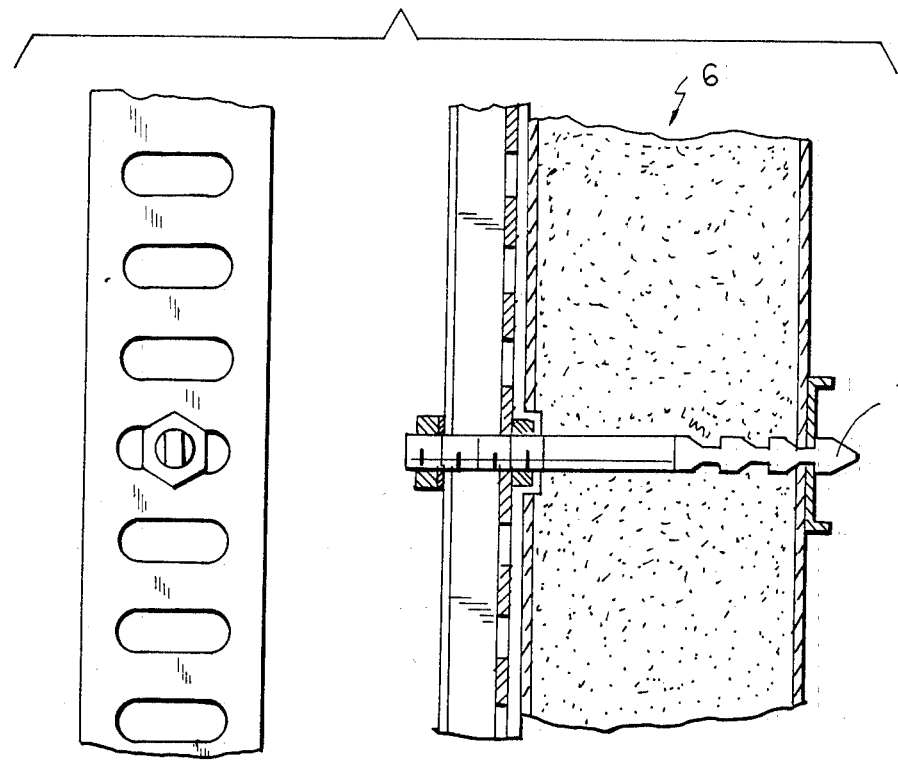
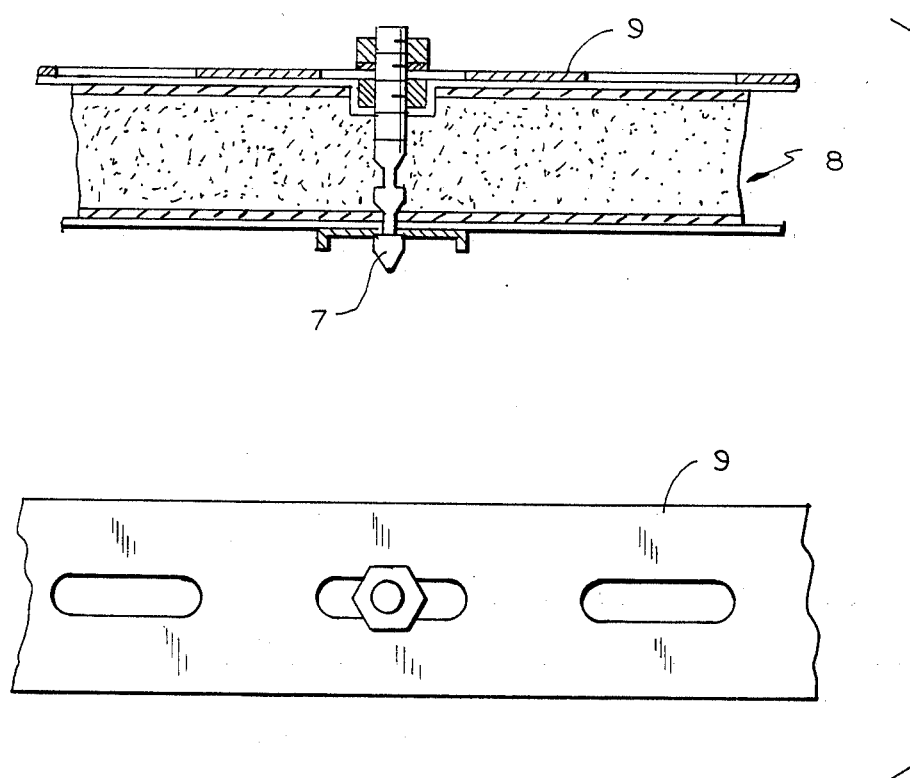
FIG. 5

ROPE SOCKET TRAYS PROTECTION AGAINST INTERNAL AND OUTER FIRES

BACKGROUND OF THE INVENTION

This is a continuation of application Ser. No. 380,004 filed May 19, 1982, abandoned.

FIELD OF THE INVENTION

The present invention relates to a rope socket tray protection device against internal and external fire, consisting of a tray protection system for cabling against outer and inner fires in relation to the tray.

SUMMARY OF THE INVENTION

Substantial advantages over all the systems that have been used so far as this date are as follows:

1. The system assures a perfect protection against external fires, however making possible the ventilation of the cabling in order to throw away heat generated therein by Joule effect, thus eliminating a possible cause of internal fire.

2. The mechanical strength features of the system make possible to remove the need of using an external lining based on plate or another tough material, with the consequent safety and simplification of the assembling.

3. The system makes possible the disassembly and subsequent assembly for maintenance, injections, modifications, etc. with an optimal reusing degree.

The system meets the most recent protection standards against fires making possible to keep the cables in operation, with no loss of their insulation, for at least one hour during a type fire.

Another important advantage resides in that the system keeps enough tightness to prevent the inlet of flames or inflammable materials into the inside of the protected duct.

The system includes essentially the mattresses made up by a fire-resistant textile material casing containing a low heat conductivity and density thermal isolation.

The mattresses are firmly anchored to a rigid support providing at the same time the means to form a sealing by deformation or pressure of the ends of the mattresses.

The contractions to be caused in the protection extreme conditions under consideration shall be absorbed by a previously calculated oversize of the mattresses sizes.

In order to prevent the mattresses from absorbing liquids that might fall over them and that would be hard to eliminate, they shall be covered with a waterproof cloth or plate not spreading the flame. The placing of such protection outside the mattress makes possible the total isolation in normal operation, although in the event of fire the antiabsorbing protection might be destroyed, and the extinction water might be leaked into by the unprotected areas and being held. The placing of the antihumidity under the incombustible cloth makes possible that the absorbed amount shall be limited to such that might be held by the external cloth, while it remains water-proof in the event of fire, with which the held water shall not mean any mechanical overcharge of the trays. Holding is made by castellated bolts assuring tightness and being incombustible.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF DRAWINGS

FIG. 4 is a partial sectional view of the side mattress in conjunction with the vertical support section;

FIG. 5 is a partial sectional view of the lower mattress in conjunction with a transversal sheet iron.

DETAILED DESCRIPTION OF THE PREFERRED EMBODIMENTS

The system may be used as individual protection of a tray or duct or as proper arrangement for the manifold or independent protection of a set of them vertically or horizontally grouped.

Figure 1:
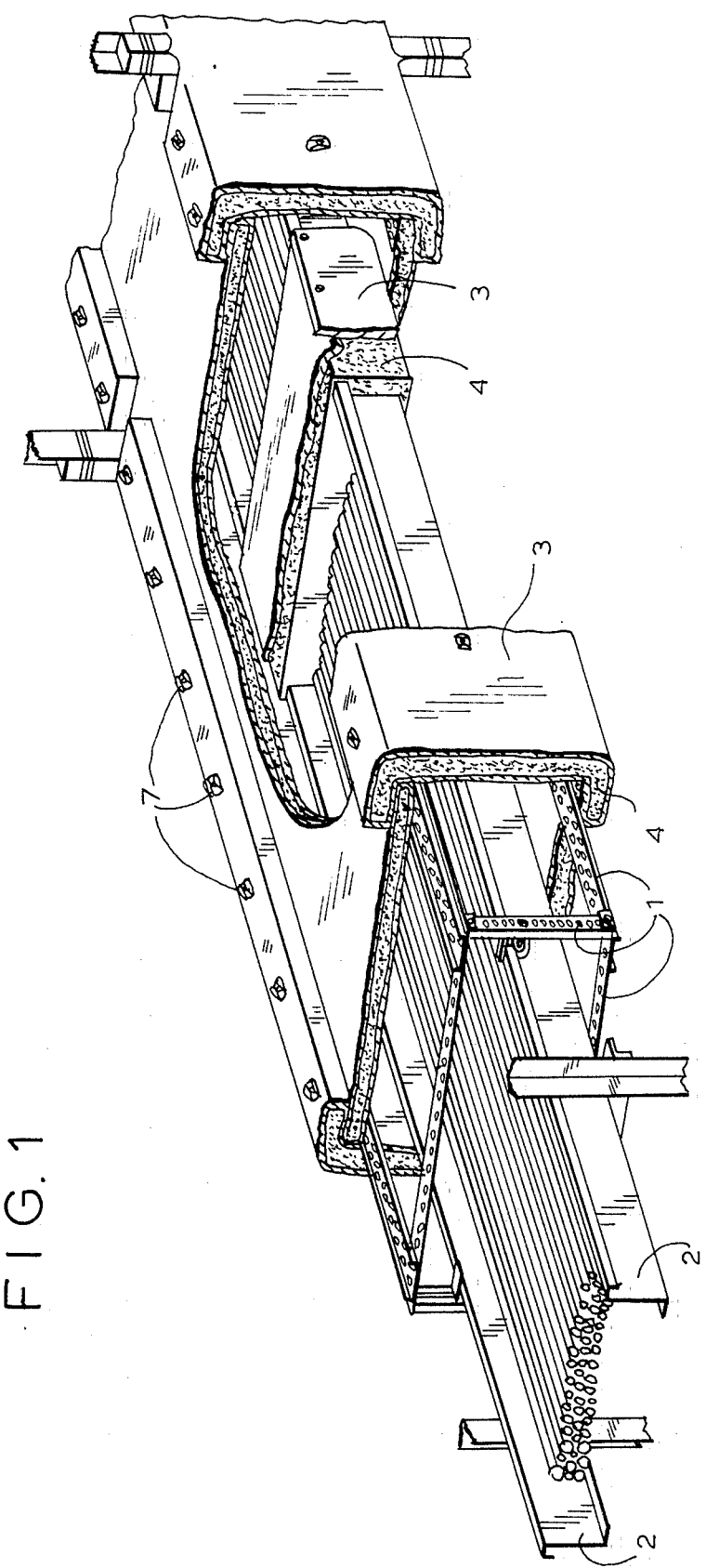
FIG. 1 is a perspective view of a tray with the protecting system according to the invention.

In FIG. 1, a tray protected by the proposed system is shown. There one can see the support of the system made on base of grooved sections (1) to reduce weight and make the assembly easier. There are longitudinal sections to support the trays (2) and to join the rectangular frames with one another. In such way, a rigid enough support is achieved, and the mattresses are supported by bolts, providing at the same time a labyrinthic closing on making it with a rigid support between the horizontal and vertical mattresses.

The mattresses are provided with a fireproof cloth casing (3), preferentially constituted in the area exposed to fire by silicon oxide fibres, and of a filling (4) that may be based on ceramic fibre blankets. The mattresses are joined to the supports by bolts, as shown in the figure.

Figure 2:
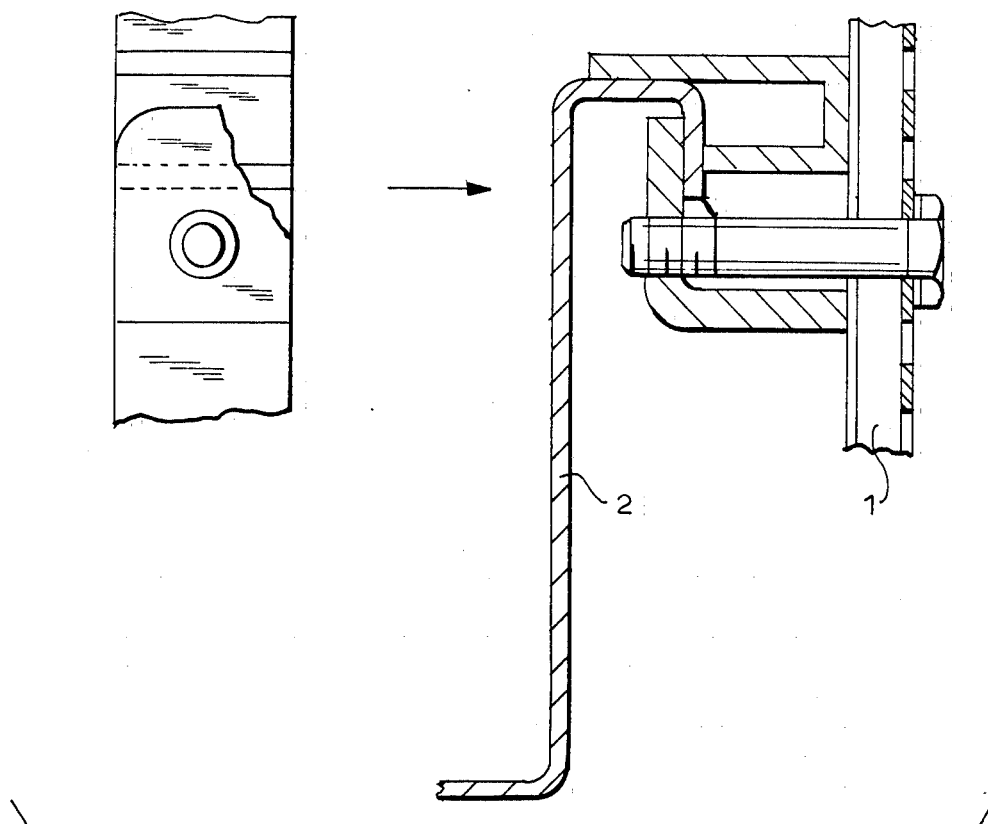
FIG. 2 is a sectional view illustrating the joining of the tray to a support section.

FIG. 2 shows a detail of the joining of the trays (2) to the grooved supports (1).

Figure 3:
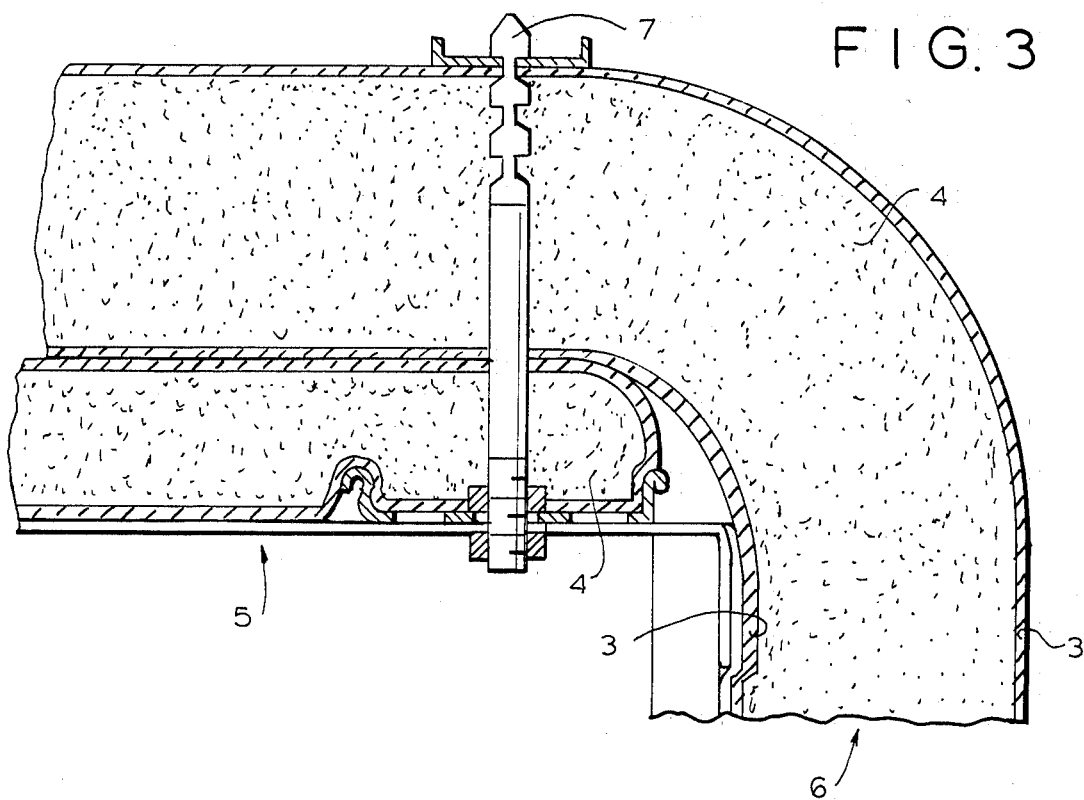
FIG. 3 is a partial sectional view of the mattresses in conjunction with the tray.

FIG. 3 shows a detail of the assembly of the mattresses to the sections and trays. The fastening of the upper mattress (5) and side mattress (6) is made by securing pivots (7).

FIG. 4 shows a detail of the joining of the side mattress (6) to the vertical section (1) and of its fastening by pivot (7).

FIG. 5 shows a detail of the assembly of the lower mattress (8) to the corresponding inferior transversal sheet iron (9) also made by pivot (7).

Figure 6A:
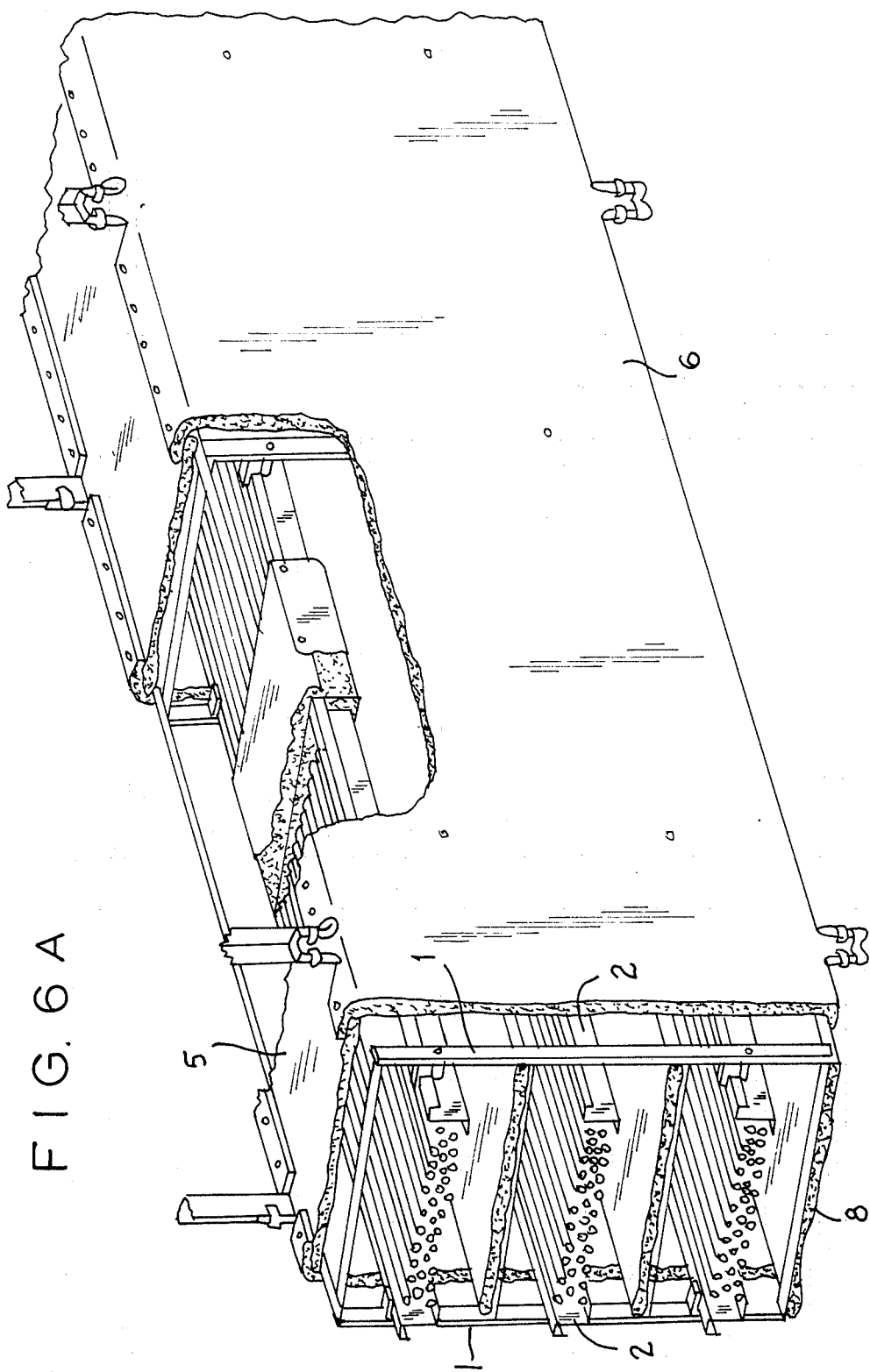
FIG. 6A shows a perspective cut-away view of the invention.
Figure 6:
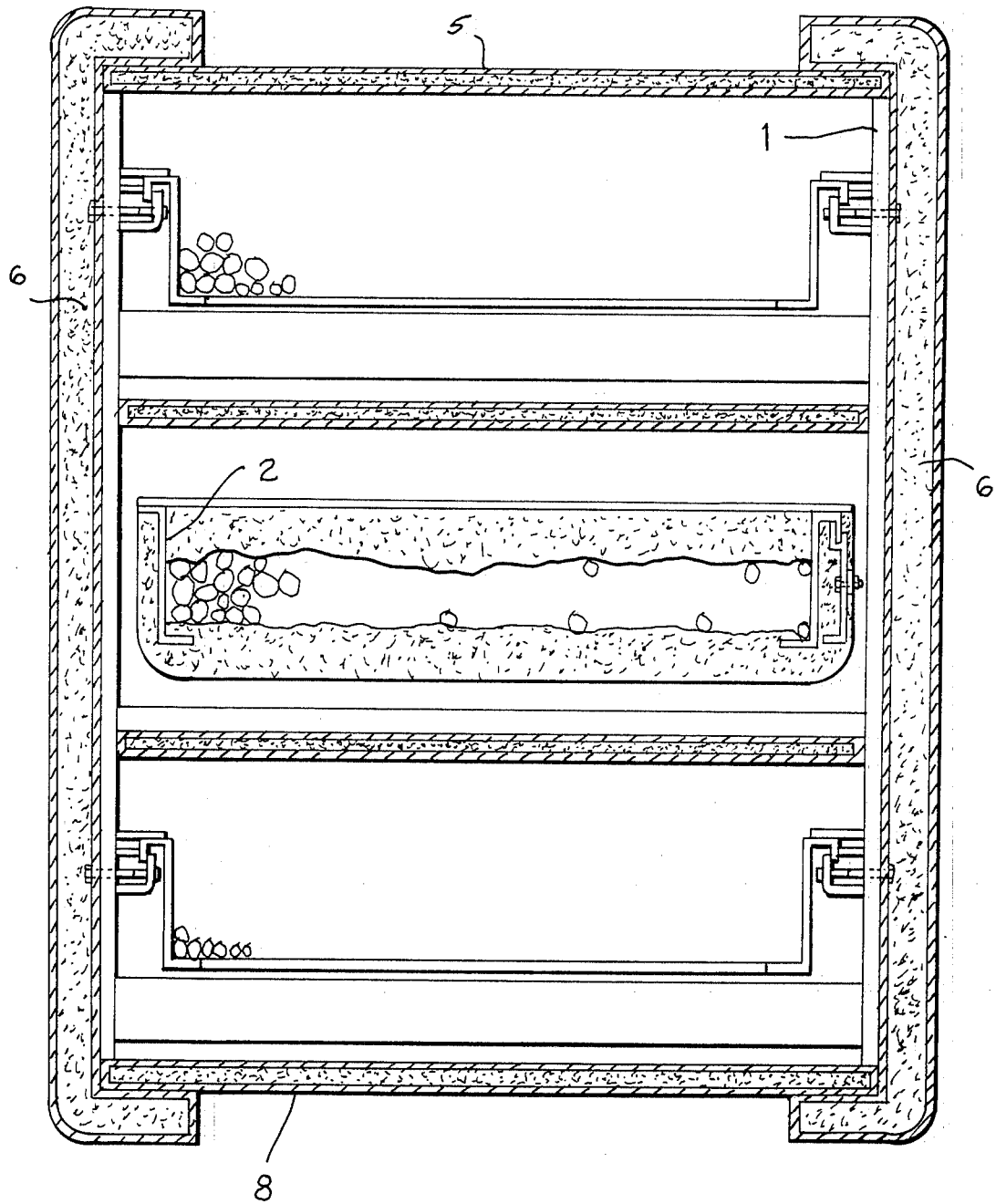
FIG. 6B shows a front view of the invention.

Finally, FIG. 6 shows in perspective and in front section an arrangement for the passive protection against fire in three superimposed trays, such as they often appear on industrial assemblies of plants under way.

A preferential design consists in the use of the lower face of a cloth of different characteristics, that being incombustible shall have not a very high fusion temperature, so that it would be destroyed in the event of internal fire, the integrity of the system would not be jeopardized, however allowing a substantial economy.

This system is feasible in any suitable sizes and materials, being capable of all kind of detail modifications provided that they shall not alter its foundation.

I claim:

1. A fire protection system for electrical cable trays comprising:

a rigid frame member having an interior substantially larger than the exterior of a cable tray;

means for coupling said rigid frame member to said cable tray wherein said rigid frame member surrounds said cable tray and wherein said interior of said rigid frame member is suspended apart from said exterior of said cable tray;

a plurality of flexible mattresses mounted to said rigid frame member, each of said plurality of flexible mattresses being formed of an inner casing of a fiberglass material and an outer cover made of a flame resistant textile material having a fusion point higher than one thousand degrees centigrade; and means for releasably connecting each of said mattresses to said rigid frame member so that any mattress can be removed from the rigid frame member and replaced with a new one and the rigid frame member can be closed with said mattresses or released from the latter without disturbing cables in said cable tray.

2. The fire protection system for electrical cable trays according to claim 1 wherein said rigid frame member is constructed utilizing a light metallic material.

3. The fire protection system for electrical cable trays according to claim 1 wherein said inner casing comprises fiberglass cloth.

4. The fire protection system for electrical cable trays according to claim 3 wherein each of said plurality of flexible mattresses is stiffened by a polygonal sewing.

5. The fire protection system for electrical cable trays according to claim 4 wherein each of said plurality of flexible mattresses includes a non-porous, fire-proof, flexible and waterproof fabric lining for preventing absorption of liquids by said mattresses, said lining being placed in two layers inside and outside each of said plurality of flexible mattresses.

6. The fire protection system for electrical cable trays according to claim 1 further including a second plurality of flexible mattresses wrapped around said cable tray.

7. The fire protection system for electrical cable trays according to claim 6 wherein each of said plurality of flexible mattresses is arranged on said cable tray with an excess of mattress material to permit retractions and dilations of each of said plurality of flexible mattresses.

8. The fire protection system for electrical cable trays according to claim 7 wherein each of said plurality of flexible mattresses is arranged on said cable tray and said rigid frame member in a labyrinth-like manner.

* * * * *